United States Patent [19]

Ploix

[11] 4,123,346
[45] Oct. 31, 1978

[54] ELECTROPHORETIC DEVICE
[75] Inventor: Jean Luc Ploix, Paris, France
[73] Assignee: Thomson-CSF, Paris, France
[21] Appl. No.: 795,424
[22] Filed: May 10, 1977
[30] Foreign Application Priority Data
  May 11, 1976 [FR] France .............................. 76 14161
[51] Int. Cl.² .......................... C25D 1/12; G03G 13/00
[52] U.S. Cl. ........................ 204/299 R; 204/180 R;
  204/299 EC; 204/181 R; 350/355; 350/350;
  40/463
[58] Field of Search ...... 204/299 R, 299 EC, 299 PE,
  204/181; 350/160 R, 160 LC, 161; 96/1 R, 1 A,
  1.5

[56] References Cited
U.S. PATENT DOCUMENTS

| 3,756,693 | 9/1973 | Ota ................................... 350/160 R |
| 3,839,857 | 10/1974 | Berets et al. ................. 350/160 R X |
| 3,892,472 | 7/1975 | Giglia .............................. 350/160 R |
| 4,045,327 | 8/1977 | Noma et al. ...................... 204/299 R |

Primary Examiner—Arthur C. Prescott
Attorney, Agent, or Firm—Roland Plottel

[57] ABSTRACT

An electrophoretic device defining a fluid tight assembled container filled with a suspension of solid electrically charged particles. Two outer plates of the container are provided with electrodes and part of the inner walls of the container and electrodes are coated with an electret layer that is a layer of dielectric material carrying permanent electrical charges. The electret layer coating one of the outer plates may be removable in order to allow the transfer of the solid electrically charged particles between different electrophoretic media. One of the outer plate may be either transparent allowing thus a presentation of data. The permanent electrical charges of the electret layer introduce a voltage treshold into the control of migration of the suspended particles in the electrophoretic medium.

15 Claims, 9 Drawing Figures

ELECTROPHORETIC DEVICE

This invention relates to an improvement in devices which utilise the phenomenon of electrophoresis. Electrophoresis is the phenomenon by which electrically charged solid particles suspended in a liquid medium are displaced under the effect of an electrical field.

Devices utilising the phenomenon of electrophoresis are already known, in particular in cells of the type used for presenting data by electrophoresis.

The data presentation cells are formed by a container provided with two parallel faces of which at least one is transparent and to which are applied transparent conductive coatings forming electrodes whose shape is characteristic of the data to be presented. The container is filled with a coloured liquid containing a suspended pigment which diffuses light. Electrical charges appear at the surface of the particles in contact with the liquid and thus define an interfacial potential.

The application of a potential difference between the electrodes results in migration of the charged particles towards one of the electrodes in the direction of the electrical field produced.

When the particles are attached to the electrode situated on the side of an observer, the ambient light is diffused by the pigment materialising the shape of the electrode and that of the characters or the data to be presented. When the particles are attached to the other electrode, the ambient light is absorbed by the liquid. In addition, in the absence of an electrical field applied between the electrodes, these systems have a memory effect due to the existence of Van der Waals forces and erasure can only be obtained by applying an oppositely directed electrical field.

However, systems such as these are attended by the following disadvantages concerning the difficulty of forming the suspension filling the container of the cell. Conventional systems of this type require high chemical and electrochemical stability on the part of the suspension liquid and a stable charge density on the part of the pigment to obtain a large number of presentations under conditions of stability of the response time.

In addition, when the system is used for presentation purposes, the holding time of the particles can be notoriously inadequate in the absence of a holding electrical field applied by way of electrodes.

The present invention enables these disadvantages to be obviated.

The object of the present invention is to provide at least part of the inner walls of the container forming the device and, in particular, at least part of the electrodes with a layer of dielectric material carrying a permanent electrical charge, or electret, said layer of dielectric material separating the inner wall of the container and the electrode or electrodes from the electrophoretic medium.

It is known that an electret is a dielectric material which has the property of retaining the electrical charge applied to it either by applying an intense electrical field after the disappearance thereof or after electron or ion bombardment.

The device according to the invention, in addition to improving the holding times of the particles on the surfaces, in other words the memory time of the device when it is used for presentation purposes, provides, on the one hand, for a threshold to be introduced into the control of migration of the particles or, on the other hand, for a considerable reduction, if not a complete elimination, of the physical contacts and interactions which take place between the particles and the walls of the device, thereby stabilising the electrophoretic medium.

According to the present invention, the permanent charge of the dielectric material or electret may be opposite in sign to the charge of the majority of particles present in suspension in the electrophoretic medium. The then attractive interaction of the electrically charged particles with the charge-carrying dielectric material or electret may permit, for example permanently, coating of the surface in question of the dielectric material with particles of opposite sign or, temporarily, a separation between charged particles and uncharged particles with a view to a subsequent transfer of the charged particles to a different electrophoretic bath.

According to the invention, the permanent charge of the dielectric material may also have the same sign as the charge of the majority of particles present in suspension in the electrophoretic medium. The then repelling inter-action of the charged particles with the dielectric material carrying permanent charges, and in the absence of any inter-action of external origin, results in the formation along the surface of contact of the dielectric material with the electrophoretic medium of a zone where the density of particles is lower, even substantially zero if the repelling effect is adequate.

The subject of the present invention has proved to be particularly interesting in its application to electrophoretic presentation systems and, in particular, may readily be integrated into presentation matrices controlled by crossed electrodes.

The invention will be better understood from the following description in conjunction with the accompanying drawings in which the same references denote the same elements and in which.

In order to enable the Figures to be better understood, the relative thicknesses of the various constituent elements of the device according to the invention have not been observed.

Figure 1:
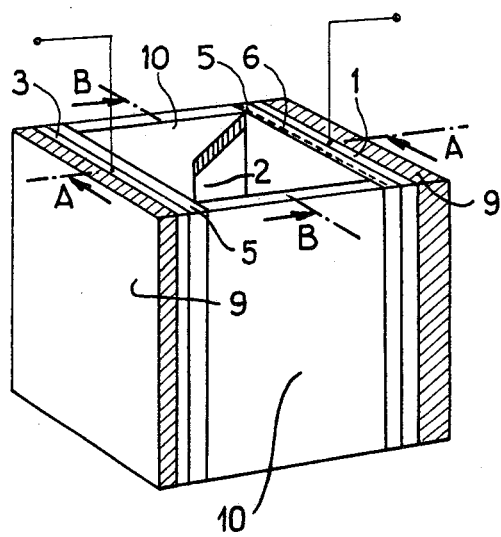
FIG. 1 is a perspective view of a device utilising the phenomenon of electrophoresis according to the present invention.

FIG. 1 shows a device provided with opposed outer plates 9 that are front and back, of which at least one, generally the front one, is transparent when the device is used for presentation purposes, and with liners 10 which, by a fluidtight connection with the above-mentioned outer plates, form a container intended to contain a liquid comprising suspended particles forming the electrophoretic medium 2. Disposed on the facing faces of each outer plate 9 are two electrodes 1 and 3 between which a potential difference may be applied.

A layer 5 of dielectric material carrying permanent electrical charges 6 completely or partly coats said electrodes, separating the electrodes from the electrophoretic medium 2 in the particular example of embodiment shown in FIG. 1. The electrophoretic medium may be formed by a highly resistive liquid ($10^9 \Omega \times m$) to which the particles of pigment have been added.

The electret layer deposited is intended to permit a resistive or capacitive coupling between the electrode or the electrodes and the electrophoretic medium. If the coupling is resistive, the resistance of the layer of dielectric material should be low by comparison with the resistance of the corresponding liquid layer. If the coupling is capacitive, the charge of the capacitor formed by the relative disposition of the electrodes, the electret itself and the electrophoretic medium should be sufficient to ensure the complete transfer of the suspended particles from one electrode to the other.

The embodiment of the invention illustrated in FIG. 1 may be used for obtaining a pigmentation on a substrate by depositing a monolayer of particles or even for separating particles into uncharged particles and charged particles with a view to a subsequent use of the charged particles in a different electrophoretic bath.

Figure 8:
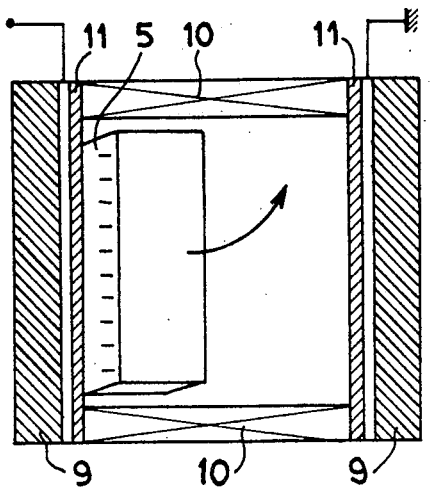
FIG. 8 is a front view of a section along the line AA of FIG. 1 of an embodiment of the invention in which the electret layer is removable.

In this case, at least one of the electret layers may be removably arranged on one of the walls of the container, as shown in FIG. 8. The removable charged electret may be transferred from an initial electrophoretic medium to another electrophoretic medium for transferring electrical charges having a given sign.

The layer or layers 5 of dielectric material are made for example of polymeric materials, such as polyvinyl alcohol (PVA), polytetrafluoroethylene (PTFE), polytrifluorochloroethylene (PTFCE), polyvinyl fluoride and poly vinyl difluoride (PVF and $PVF_2$), polyimides, polyamides, polyesters, polyolefins, such as polyethylene or polypropylene.

The layers may be deposited by any of the known techniques, such as deposition by solvent evaporation in vacuo by Joule effect heating, evaporation in vacuo with an electron gun or by heating with a laser.

These layers may be charged by methods well known to the expert such as corona discharge, electron or ion bombarment.

Figure 2:
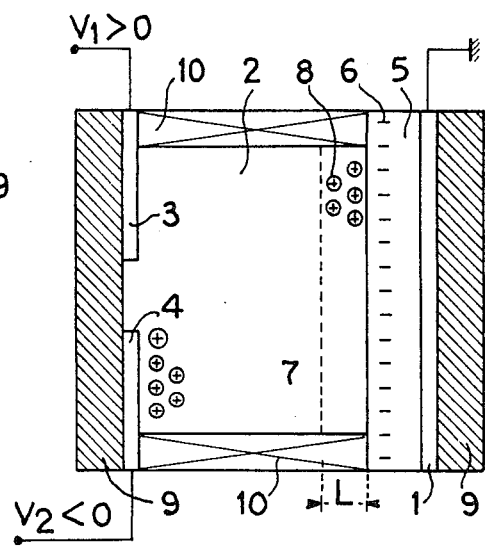
FIG. 2 is a front view of a section along the line AA of FIG. 1 of one particular embodiment of the present invention.

FIG. 2, which relates to one particular embodiment of the invention, shows two electrodes 3 and 4 each disposed on one of the outer faces 9 and a layer 5 of dielectric material carrying permanent charges 6 shown by way of example as negative charges. This layer 5 of dielectric material completely covers the electrode 1 and separates it from the electrophoretic medium 2. These permanent charges 6 create in the electrophoretic medium 2 a zone from which the ions with the same sign (negative in the example illustrated) as the permanent charges of the dielectric material are removed and where the ions of opposite sign, as illustrated, are accumulated.

This space charge zone has a thickness L directly related to the parameters of relative permittivity of the liquid, absolute temperature of the electrophoretic medium and concentration of the ions. Taking into account the actual parameters of the components of an electrophoretic medium, the thickness L of the space charge zone may reach a few microns.

The thickness of the layer of liquid determined by the liners 10 may be selected very much greater than the thickness L of the space charge. Under these conditions and in the absence of any external interference, the potential difference between the surfaces of the layer of liquid, due to the presence of the permanent charges carried by the layer of dielectric material, is proportional to the electrical charge surface density of the dielectric material and to the thickness L of the space charge zone.

Under normal conditions, i.e. for a charge surface density of the dielectric material of $2 \cdot 10^{-4}$ $Cb/m^2$ and for a dielectric material with a permittivity $\epsilon_0 \cdot \epsilon_r = 2 \cdot 10^{-11}$ F/m, the thickness of the space charge zone being fixed at a value between $2 \cdot 10^{-6}$ and $5 \cdot 10^{-6}$ meters, the voltage in the layer resulting from the presence of the permanent charges will amount to between 20 and 50 volts.

As a result, the particles 8, positively charged in the example illustrated, will effectively be exposed to the influence of the permanent charges 6 of the dielectric material when they are situated inside the space charge zone, the positive particles 8 thus being attracted by the negative charges 6 of the dielectric material. Thus, these particles 8 will only be detached from the dielectric material in the presence of a potential difference applied by the electrodes 1 and 3 or 1 and 4, this potential difference being at least equal in tems of absolute value to that existing at the terminals of the layer of liquid and resulting from the presence of the permanent charges 6 at the surface of the dielectric material 5 and opposite in sign.

When the particles have to be displaced from the electrodes 3 or 4 towards the electrode 1, the cell will behave in the same way as an ordinary electrophoretic cell.

Figure 3:
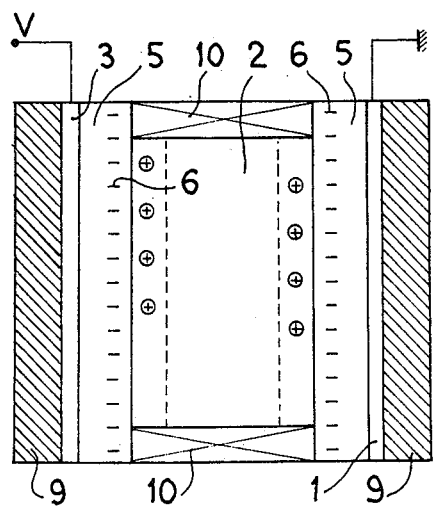
FIGS. 3 and 4 are front views of a section along the line AA of another particular embodiment of the present invention.

FIG. 3 shows two electrodes 1 and 3 respectively attached to the outer surfaces 9 of the electrophoretic cell and each covered by a layer of dielectric material carrying a permanent charge 6 opposite in sign to the charge of the majority of particles suspended in the liquid.

This results in the appearance of a threshold for the switching operations in the two directions and in an improvement in the holding time of the particles on the surface of the dielectric material and hence in the memory time of the device.

Figure 4:
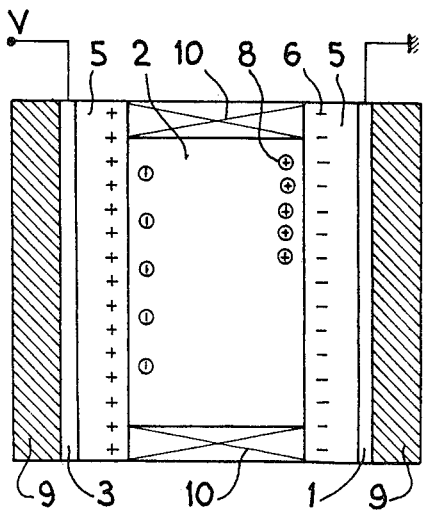

In the embodiment illustrated in FIG. 4, the electrets may carry charges 6 of opposite sign. In this case, the cell is dissymetrised to a significant extent. It is thus possible to ensure a good memory in one of the states corresponding as before to an attraction of the particles of which the majority carries chages opposite in sign to those of a given electret, and the absence of memory in the absence of external action in the state corresponding to a repulsion of the particles of which the majority carries charges having the same sign as those of a different electret. .

It is also possible, by suitable means well known to the expert, to regulate the value and sign of the charge of the layers of dielectric material in such a way that any intermediate situation between the two embodiments of the invention shown in FIGS. 3 and 4 does not go beyond the scope thereof.

Figure 5:
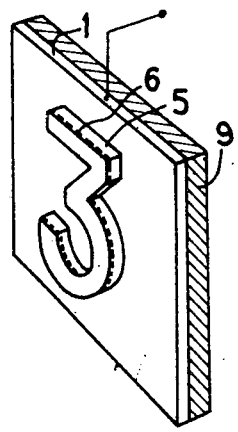
FIGS. 5 and 6 are front views of a section along the line BB of FIG. 1 of another particular embodiment of the present invention.

FIG. 5 shows one particular embodiment of the invention in which the dielectric layer 5 does not coat the entire surface of said inner walls of the container but a part of them and in which, in particular, the layer of dielectric material is cut out according to the particular style of an α-numerical character. Accordingly, in the application of the invention to electrophoretic data-presentation cells, a memory effect may be obtained as described above at the level of presentation of the character or data in question.

Figure 6:
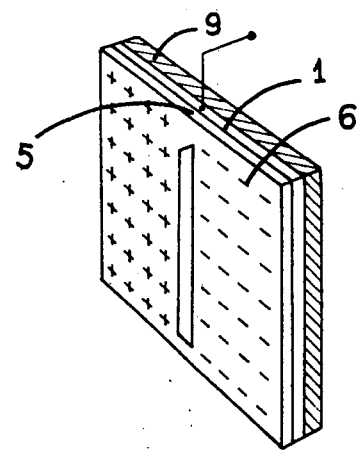

FIG. 6 shows another particular embodiment of the invention in which the dielectric layer 5 carries electrical charges of opposite sign in particular zones of its surface. In this case, the separation between the zones of different sign is used for defining an α-numerical character of particular shape.

In addition, as pointed out above, it is possible by means of devices well known to the expert, to use a dielectric material of which the charge density per unit surface is variable from one point to the other of that surface. This particular embodiment may also be used in electrophoretic presentation cells, particularly in cases where various characters are combined on one and the same surface, in which case selection of the character to be presented by means of voltages applied to the electrodes may be effected taking into account the sign and the value of the permanent charge defining a given character.

Figure 7:
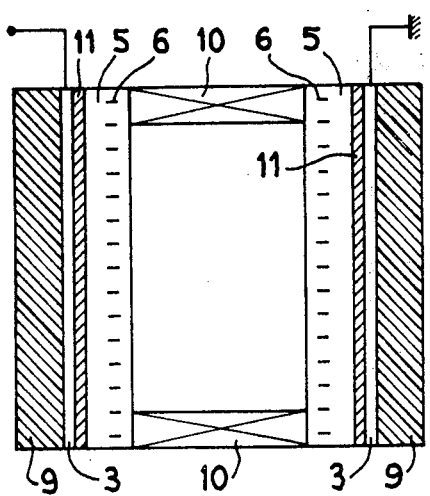
FIG. 7 is a front view of a section along the line AA of FIG. 1 of another particular embodiment of the present invention.

In the particular embodiment illustrated in FIG. 7, the layers of dielectric material carrying permanent electrical charges are themselves deposited onto one or more electrically neutral dielectric layers 11 forming a coating on one or each of the inner surfaces of the cell.

Figure 9:
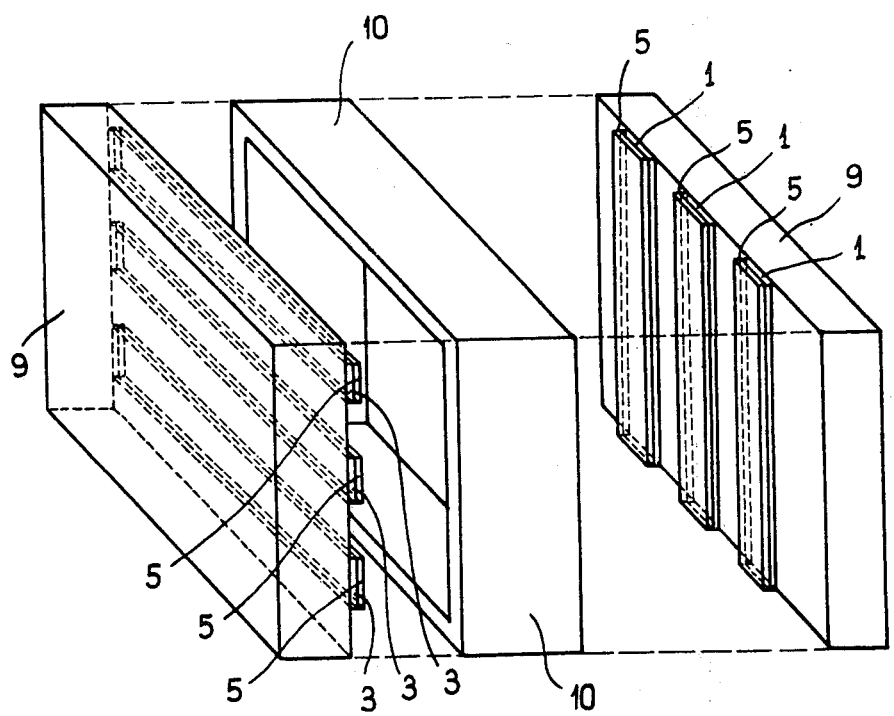
FIG. 9 shows a presentation matrix controlled by crossed electrodes using the electrophoretic device according to the invention.

In FIG. 9, the presentation matrix controlled by corossed electrodes shown in the form of a perspective exploded view, comprises two transparent plates 9 of which the inner wall of one is provided with horizontal electrodes 3, the inner wall of the other being provided with vertical electrodes 1. The vertical electrodes 1 and 3 are respectively covered by a layer 5 of dielectric material carrying permanent electrical charges, or an electret layer. The electret layers 5 carry electrical charges with a given sign and, according to the invention, introduce a threshold into the control of migration of the suspended particles in the electrophoretic medium. The two transparent plates provided with electrodes coated with a layer of electret are assembled in fluid-tight manner by means of liners 10.

In order further to simplify production, the electret layer coating the electrodes 1 or 3 may with advantage be formed by a single layer coating both the electrodes and the inner surface of a plate 9 without departing from the scope of the invention.

Of course the invention is not limited to the embodiment described and shown which was given solely, by way of example.

What is claimed is:
1. An electrophoretic device comprising:
two outer plates and liners assembled in a fluid-tight manner the inner walls of said outer plates and liners forming a container accomodating a suspension of solid electrically charged particles in a liquid medium;
electrodes on the facing faces of said outer plates between which a potential difference is applied in operation.
an electret layer consisting of a layer of dielectric material carrying a permanent electrical charge said electret layer coating at least pat of the inner walls of the device.

2. A device as claimed in claim 1, wherein one of its inner walls provided with one or more electrodes comprises an electret layer separating said inner wall and electrodes from the liquid medium.

3. A device as claimed in claim 2, wherein the electret layer carries an electrical charge having the same sign as the charge of the majority of suspended particles.

4. A device as claimed in claim 2, wherein said electret layer is removable allowing electrical charged particles to be transferred between different electrophoretic media.

5. A device as claimed in claim 4, wherein said electret layer carries an electrical charge opposite in sign to that of the majority of suspended particles.

6. A device as claimed in claim 1, wherein the two facing surfaces of the outer plates provided with one or more electrodes, one of said outer plate being transparent, permanently comprise an electret layer, said layer separating the corresponding inner wall and the electrodes from the liquid medium and permitting a presentation of data.

7. A device as claimed in claim 6, wherein the electret layer carries an electrical charge opposite in sign to that of the majority of suspended particles.

8. A device as claimed in claim 6, wherein the electret layer carries an electrical charge having the same sign as the charge of the majority of suspended particles.

9. A device as claimed in claim 6 wherein te electret layer on the facing surfaces of the outer plates carries electrical charges of opposite sign.

10. A device as claimed in claim 6, wherein the electret layer is deposited on electrically neutral dielectric layers deposited onto the inner walls.

11. A device as claimed in claim 6, wherein the electret layer on the facing surfaces of the two outer plates carry electrical charges opposite in sign to the charge of the majority of suspended particles, said electrical charges introducing a threshold.

12. A device as claimed in claim 11, wherein at least a part of the electret layer comprises at various points of its surface electrical charges opposite in sign forming a particular pattern.

13. A device as claimed in claim 11, wherein the electret layer carries a charge of which the surface density varies from one point to another of said surface and corresponds to different threshold voltages.

14. A device as claimed in claim 11, wherein the electret layer on the facing surfaces of the two outer plates coats only part of said inner wall according to a particular cut out.

15. A device as claimed in claim 14, wherein the electret layer on the facing faces of the two outer plates coating only part of said inner wall according to a particular cut out forms a presentation matrix controlled by crossed electrodes comprising:
horizontal electrodes (3) provided on the inner wall of one outer plate;
vertical electrodes (1) provided on the inner wall of the other outer plate;
an electret layer (5) coating said vertical electrodes (1) and horizontal electrodes (3) and introducing a threshold into the control of migration of the suspended particles in the electrophoretic medium.

* * * * *